US010838839B2

(12) United States Patent
Megahed et al.

(10) Patent No.: US 10,838,839 B2
(45) Date of Patent: *Nov. 17, 2020

(54) OPTIMIZING ADAPTIVE MONITORING IN RESOURCE CONSTRAINED ENVIRONMENTS

(71) Applicant: International Business Machines Corporation, Armonk, NY (US)

(72) Inventors: Aly Megahed, San Jose, CA (US); Mohamed Mohamed, San Jose, CA (US); Samir Tata, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,063

(22) Filed: Mar. 1, 2019

(65) Prior Publication Data

US 2019/0196929 A1    Jun. 27, 2019

Related U.S. Application Data

(63) Continuation of application No. 15/397,882, filed on Jan. 4, 2017, now Pat. No. 10,235,263.

(51) Int. Cl.
*G06F 11/30* (2006.01)
*G06F 11/00* (2006.01)

(52) U.S. Cl.
CPC .......... *G06F 11/3093* (2013.01); *G06F 11/00* (2013.01)

(58) Field of Classification Search
CPC .. G06F 11/00; G06F 11/3093; G06F 11/3495; H04L 67/10; H04W 72/02
See application file for complete search history.

(56) References Cited

U.S. PATENT DOCUMENTS

| 8,108,235 | B2 | 1/2012 | Chowdhary et al. |
| 8,600,915 | B2 | 12/2013 | Thompson |
| 8,635,328 | B2 | 1/2014 | Corley et al. |
| 9,135,135 | B2 | 9/2015 | Rao et al. |
| 9,235,556 | B2 | 1/2016 | Yaakov et al. |
| 9,317,387 | B2 | 4/2016 | Kariv |
| 9,378,111 | B2 | 6/2016 | Ramesh Coimbatore et al. |

(Continued)

FOREIGN PATENT DOCUMENTS

EP    2874064 A1    5/2015

OTHER PUBLICATIONS

List of IBM Patents and Patent Applications Treated as Related, dated Sep. 16, 2019. 2 pages.

(Continued)

*Primary Examiner* — Bryan Bui
(74) *Attorney, Agent, or Firm* — Jay Wahlquist

(57) ABSTRACT

Adaptive monitoring dynamically optimizes the monitoring frequency of metrics with respect to system constraints. One or more metrics are monitored. The monitoring includes receiving a value for the metric and evaluating the received metric value. If the evaluation is determined to affect one or monitoring parameters, or if an environment-based event occurs the metrics are adapted. Adapting metrics includes removing or adding a metric based on each metric's correlation to the affected monitoring parameter or environment based trigger. The frequencies of the metrics are optimized based on the available resources.

20 Claims, 5 Drawing Sheets

(56) References Cited

U.S. PATENT DOCUMENTS

| | | | |
|---|---|---|---|
| 9,405,593 | B2 | 8/2016 | McGrath et al. |
| 9,483,392 | B1 | 11/2016 | Chirgwin et al. |
| 9,501,330 | B2 | 11/2016 | McGrath et al. |
| 9,628,340 | B2 | 4/2017 | Blair |
| 10,235,263 | B2 * | 3/2019 | Megahed ............ G06F 11/00 |
| 2009/0262656 | A1 | 10/2009 | Branson et al. |
| 2010/0077449 | A1 | 3/2010 | Kwok |
| 2011/0088022 | A1 | 4/2011 | Kruglick |
| 2012/0054331 | A1 | 3/2012 | Dagan |
| 2012/0239739 | A1 | 9/2012 | Manglik et al. |
| 2013/0173803 | A1 | 7/2013 | Pijewski et al. |
| 2013/0290539 | A1 | 10/2013 | Kodialam |
| 2014/0133453 | A1 | 5/2014 | Maciel et al. |
| 2015/0124612 | A1 | 5/2015 | Schlansker et al. |
| 2015/0286507 | A1 | 10/2015 | Elmroth et al. |
| 2016/0196527 | A1 | 7/2016 | Bose |
| 2017/0046374 | A1 | 2/2017 | Fletcher |
| 2017/0106144 | A1 * | 4/2017 | Kasamanian ........ A61M 5/1723 |
| 2017/0168914 | A1 | 6/2017 | Altman et al. |
| 2018/0006888 | A1 | 1/2018 | Vaughn |
| 2018/0189163 | A1 | 7/2018 | Megahed et al. |
| 2019/0095478 | A1 | 3/2019 | Tankersley |
| 2019/0363968 | A1 | 11/2019 | Megahed |

OTHER PUBLICATIONS

Tata, et al., "Adaptive Multi-Tenant Monitoring in Resource Constrained Environments", U.S. Appl. No. 16/572,765, filed Sep. 17, 2019.

Doraisamy et al., "Metric Based Software Project Performance Monitoring Model", 2015 IEEE Conference on Open Systems (ICOS), Aug. 24-26, 2015, Melaka, Malaysia, pp. 12-17.

Geng et al., "DAML: Domain Adaptation Metric Learning", IEEE Transactions on Image Processing, vol. 20, No. 10, Oct. 2011, pp. 2980-2989.

IBM, "Method to manage reservation and allocation of scarce resources shared by tenants in a massively multi-tenant environment", IP.com Prior Art Database Technical Disclosure, Oct. 12, 2009. IP.com No. IPCOM000188508D. 7 pages.

Jeswani, et al., "Adaptive Monitoring: A Framework to Adapt Passive Monitoring using Probing", 2012 8th International Conference on Network and Service Management (CNSM 2012): Mini-Conference. 7 pages.

List of IBM Patents and Patent Applications Treated as Related. Dated Mar. 1, 2019. 2 pages.

Mell et al., "The NIST Definition of Cloud Computing", National Institute of Standards and Technology, Special Publication 800-145. Sep. 2011. 7 pages.

Munawar, et al., "Adaptive Monitoring with Dynamic Differential Tracing-based Diagnosis", DSOM 2008, LNCS 5273. 14 pages.

Rimal, "Workflow Scheduling in Multi-Tenant Cloud Computing Environments", IEEE Transactions on Parallel and Distributed Systems, vol. 28, No. 1, Jan. 2017. 15 pages.

Tata, et al., "Adaptive Multi-Tenant Monitoring in Resource Constrained Environments", U.S. Appl. No. 15/700,043, filed Sep. 8, 2017.

Trinihas, et al., "AdaM: an Adaptive Monitoring Framework for Sampling and Filtering on IoT Devices", 2015 IEEE International Conference on Big Data. 10 pages.

Akbar et al., "Predicting Complex Events for Pro-Active IoT Applications," 2015 IEEE 2nd World Forum on Internet of Things (WF-IoT), pp. 327-332, IEEE, 2015.

Bousdekis et al., "A Probabilistic Model for Context-Aware Proactive Decision Making," 2016 7th International Conference on Information, Intelligence, Systems & Applications (IISA), pp. 1-6, IEEE, 2016.

Engel et al., "A Basic Model for Proactive Event-Driven Computing," Proceedings of the 6th ACM International Conference on Distributed Event-Based Systems, pp. 107-118, ACM, 2012.

List of IBM Patents and Patent Applications Treated as Related, Apr. 29, 2020. 2 pages.

Tata et al., "An Optimization Approach for Adaptive Monitoring in IoT Environments," 2017 IEEE 14th International Conference on Services Computing, pp. 378-385, IEEE, 2017.

Zhu et al., "Predictive Analytics by using Bayesian Model Averaging for Large-Scale Internet of Things," International Journal of Distributed Sensor Networks 9, No. 12 (2013): 723260.

* cited by examiner

# OPTIMIZING ADAPTIVE MONITORING IN RESOURCE CONSTRAINED ENVIRONMENTS

BACKGROUND

The present embodiments relate to adaptive monitoring. More specifically, the embodiments relate to dynamically optimizing the frequency of metrics and types of metrics with respect to system constraints.

Computer systems monitor various metrics, e.g. physical properties, utilizing various sensors and devices. A sensor is a device that detects or measures a property, and records, indicates, transmits, or responds to the detection or measurement. A metric can be weather related (e.g. temperature and humidity), health related (e.g. blood pressure and heart beat), transportation related (traffics accidents and traffic jams), or other types of metrics. Various sensor configurations may be employed to measure different metrics.

It is understood that sensors and associated sensor data related to the metrics are employed in a system to support the operation of one or more physical devices. Physical devices operate more effectively when supported by the appropriate metrics and appropriate frequency of receipt of sensor data correlated to the metrics. An active sensor can monitor one or more metrics and produce a metric value, e.g. data, to transmit to a hardware device or software. A hardware or software device utilizes one or more system resources when determining and processing a metric value. Hardware and software used in the requesting, transmitting, and processing of metric values has a finite quantity of available resources to handle the data. Due to the finite quantity of available resources, all metrics cannot be monitored continuously, and as such are subject to selection.

SUMMARY

A system, computer program product, and method are provided for optimal adaptive monitoring.

In one aspect, a system is provided with a processing unit in communication with a memory, and a functional unit in communication with the processing unit. The functional unit has an adaptive monitor to actively monitor at least one metric in real-time. More specifically, a first metric is monitored at a first frequency returning a first metric value, and a secondary condition is passively evaluated. The adaptive monitor identifies an adaptation of the monitoring based on a condition. The condition may be a first metric value and/or a secondary condition. In response to the condition, the adaptive monitor dynamically adapts the monitoring, with the dynamic adjustment including a selection of metrics. More specifically, the adaptive monitor assesses selection of active metrics to retain, to remove, and to add, in response to the returned metric value and evaluated secondary condition. The adaptive monitor computes a frequency for each retained and added metric based on resource availability and selectively assigns the computed frequency to the added and retained metrics.

In another aspect, a computer program product is provided for optimal adaptive monitoring. The computer program product includes a computer readable storage medium with embodied program code that is configured to be executed by a processing unit. Program code to actively monitors at least one metric in real-time. More specifically, a first metric is monitored at a first frequency, with the monitoring returning a first metric value, and a secondary condition is passively evaluated. Program code identifies an adaptation of the monitoring based on a condition. The condition may be a first metric value and/or a secondary condition. In response to the condition, program code dynamically adapts the monitoring, with the dynamic adjustment including a selection of metrics. More specifically, the dynamic adjustment includes program code to perform an assessment of a selection of active metrics to retain, to remove, and to add, in response to the returned metric value and evaluated secondary condition. Program code computes a frequency for each retained and added metric based on resource availability, and selectively assigns the computed frequency to the added and retained metrics.

In yet another aspect, a method is provided for optimal adaptation of metrics. At least one metric is actively monitored in real-time. More specifically, a first metric is monitored at a first frequency returning a first metric value, and a secondary condition is passively evaluated. An adaptation of the monitoring is identified based on a condition, such as a first metric value and/or a secondary condition. In response to the condition, monitoring is dynamically adapted by adjustment of a selection of metrics. More specifically, the selection of active metrics assesses and identifies metrics to retain, to remove, and to add, with the assessment taking into account the returned metric value and evaluated secondary condition. A frequency is computed for each retained and added metric based on resource availability, and the frequency is selectively assigned to the added and retained metrics.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
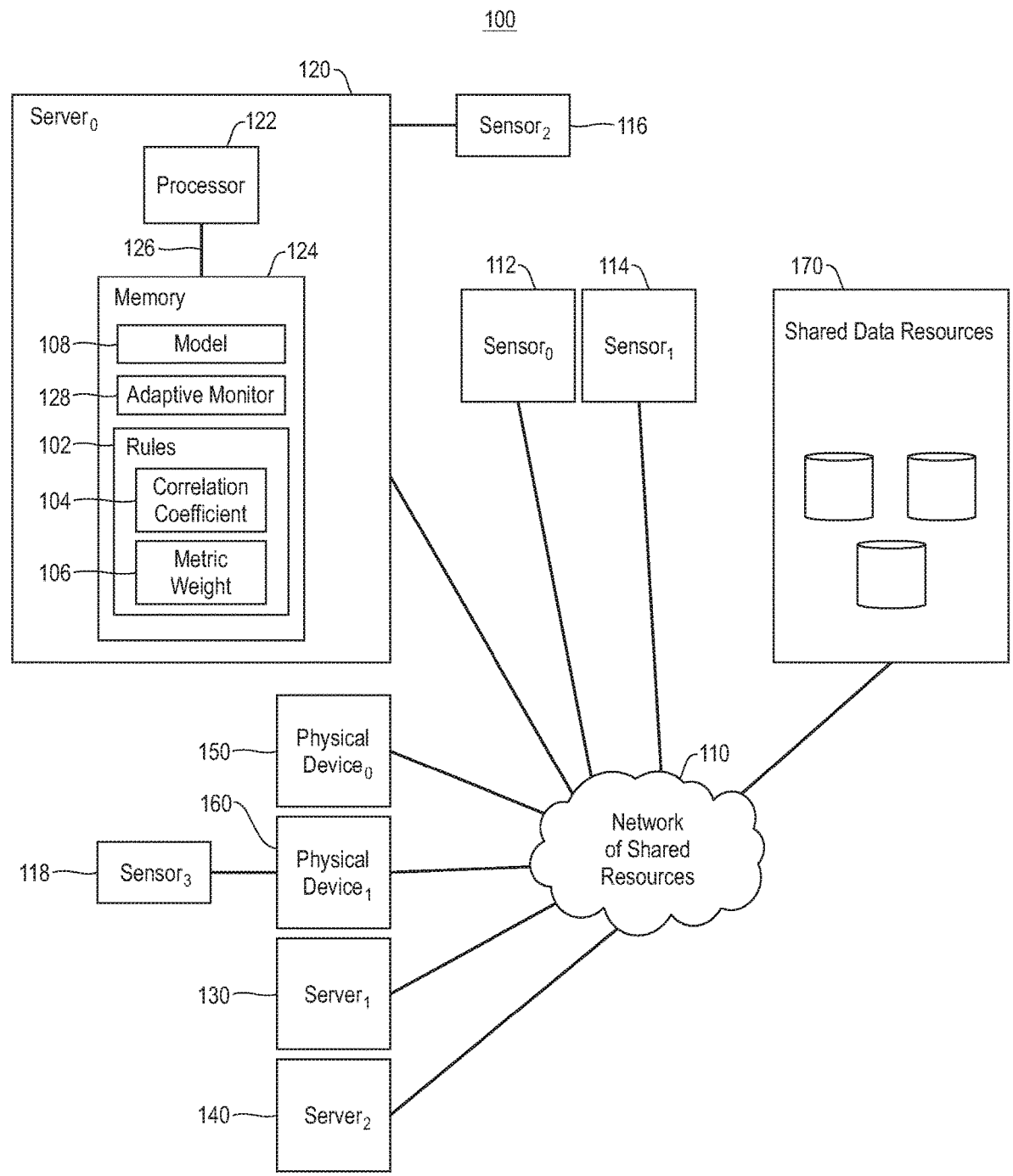
FIG. 1 depicts a block diagram illustrating a computer system that supports and enables adaptive monitoring.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A sensor is a device that detects or measures a property (e.g. biological, chemical, and physical), and records, indicates, transmits, or responds to the detection or measurement. Various sensor configurations may be employed to measure different properties. It is understood that sensors and associated sensor data correlate to one or more properties may be employed in a system to support one or more physical devices. Examples of such physical devices may be, but are not limited to, smart phones and smart cars. Data gathered from the sensors is reported to the physical devices and/or an application in support of the physical devices. It is noted that the term parameter as described herein is a monitored metric, and a condition (e.g. secondary condition) is the environmental event that occurs.

Software applications may be, but are not limited to, navigation applications, health applications and weather applications. In one embodiment, the sensor data is stored in memory. All systems necessarily have a limited capacity with respect to acquiring data and storing data, although some systems may have larger capacity than other systems. For example, the amount of data transmitted through a network is limited by bandwidth. Similarly, the amount of stored data is limited by data storage. Similarly, computer implemented systems that may be employed for processing the sensor data have limitations related to system processing resources. Comparably, portable devices have limited battery power.

Performing a selection of sensors, which measure properties that optimally support the physical device, is a challenge. Sets of rules are employed to address and support the property selection and the corresponding sensor(s) that are employed in the measurement of the property. For example, in one embodiment, a first set of rules are employed to address selection of one or more properties to be measured and the corresponding sensors to perform the measurement in support of the physical device, a second set of rules are employed to address parameters for delivery of the sensor data from the sensors identified with the first set of rules, e.g. frequency, and a third set of rules relate to the physical setting, e.g. environment, of the physical device and/or identified sensors. The aspect of attaining the selection is automated, with the rules setting the selection, frequency, and associated environment. In one embodiment, attaining the selection is dynamic, with the rules implementing a background process that creates and manages the properties to be measured, the selection and settings of the sensors to measure the properties, and application of the sensor data to the physical device in real-time. Accordingly, an optimal configuration of the physical device for performing one or more tasks is supported with the dynamic selection and application of the sensors.

Monitoring determines a value for a property (e.g. chemical, biological, and physical). Different categories of monitoring to support the physical device are employed to address the dynamic aspect of the support. One of the categories related to event-based monitoring employs or establishes a set of rules in response to occurrence of an event. For example, in the case of a smart automobile performing a navigation task including monitoring a set of metrics of a primary route determines the primary route is closed, the navigation task monitors a secondary route including metrics of a secondary route to continue the navigation task. In one embodiment, the closed primary route may activate a sensor to measure the speed of vehicles on the secondary route. Another category of monitoring is referred to as environment-based monitoring, which employs or establishes a set of rules in response to a physical device being exposed to a specific scenario. Environment changes are events that trigger the monitoring of other related metrics. For example, if the subject device is located in an area where a fire occurs, the selection of sensors and frequency at which the selection is monitored may be adapted to address the fire, e.g. activate sensors to measure temperature, and Carbon Dioxide of the environment surrounding the fire. In one embodiment, in response to the physical device being located in an area subject to a condition, the physical setting of the device may be modified. Accordingly, rules are employed to address the selection of sensors based on both event and environmental categories.

Another category of monitoring is referred to as periodic-based monitoring which employs or establishes a set of rules for changes in currently measured properties utilizing sensors to perform measurements at intervals, e.g. regular time periods, in support of a task on a device. For example, in the case of a performance of a blood pressure sensor measuring blood pressure once per week, if the value of the measurement satisfies a monitoring condition, the settings of the sensor may be modified to perform the blood pressure measurement more frequently, e.g. daily, or less frequently, e.g. monthly. In one embodiment, a value of a measurement satisfying a monitoring condition can affect the selection of parameters to be measured such as adding an additional parameter, e.g. a measurement of heart rate, or removing a parameter, e.g. stop performance of the blood pressure measurement. In one embodiment, other periodic measurements may be performed such as a temperature measurement performed once per hour, and a memory consumption of physical device performed one time per second. Accordingly, rules are employed to address selection of properties to be measured and sensors corresponding to the properties and frequency of the measurements based on values for the properties.

Throughout the monitoring process, resources are utilized in support of the physical device to request data, read data, transmit data, and process data. The resources, utilized in order to measure properties, may be, but are not limited to, network facilities, switches, routers, firewalls, servers, hubs, network access cards, data storage, display space, processing resources, electrical power, and battery life. In one embodiment, the resources have finite capacities which can limit how much data can be transmitted, received or processed during a period of time. In one embodiment, a resource has expandable capacity. Limiting the resource with expanded capacity to a specific utilization will limit costs of having to expand the capacity of the resource. Accordingly, increasing measurement of properties (quantity or frequency) increases resource utilization.

A physical device is in communication with one or more sensors deployed in various locations throughout a network. The physical device utilizes the one or more sensors to measure a metric in support of a task on the physical device. Example of the task may be, but are not limited to, navigation, and health monitoring. During performance of the task, data corresponding to the one or more metrics is utilized. The data the physical device can receive and process is limited due to resource constraints.

The physical device and network have constrained resources which limit the quantity of data that can be transmitted, received, and processed. For example, during a navigation task, including turn-by-turn directions, a route from a starting point to a destination is selected including a rule to minimize time to destination. The navigation task includes monitoring metrics such as traffic flow (e.g. speed, accidents), speed of physical device, and location of the physical device (GPS). The frequency of measurements and any alternative routes that are monitored are limited due to resource constraints of the physical device or a network in communication with the physical device. In one embodiment, a traffic accident occurs on the current route, in response the physical device changes a physical setting to receive traffic data corresponding to alternative routes so that the navigation task can determine if a quicker route is available. In one embodiment, if the measured traffic speed is below a threshold, in response the physical device changes a physical setting to receive traffic data corresponding to alternative routes. Accordingly, a physical device adapts monitored metrics to optimally perform a task.

An optimal support of the task requires the physical device to be provided with pertinent metric data. Referring to FIG. 1, a block diagram (100) is provided illustrating a computer system that supports and enables adaptive metric monitoring in support of a task. As shown, a server, $server_0$ (120) is shown configured with a processing unit (122) in communication with memory (124) across a bus (126). $Server_0$ (120) is in communication with a network of shared resources (110) across a network connection to provide the $server_0$ (120) with access to shared resources, including, but not limited to, shared data resources (170), other servers, such as $server_1$ (130) and $server_2$ (140), physical devices, such as $physical device_0$ (150) and $physical device_1$ (160), and sensors, $sensor_0$ (112) and $sensor_1$ (114). In one embodiment, $sensor_2$ (116) is provided in communication with $server_0$ (120). In one embodiment, $sensor_3$ (118) is provided in communication with $physical device_1$ (160). The position, configuration, and quantity of sensors should not be considered limiting. The sensors may be, but are not limited to, temperature probes, hydrometers, security cameras, GPS sensors, heart beat monitor, blood pressure monitor, or another type of sensor. Accordingly, a plurality of sensors is shown in communication with $server_0$ (120), either directly or indirectly via the shared resources (110), with each sensor configured to measure one or more metrics.

As shown, $server_0$ (120) is provided with an adaptive monitor (128) to interface with the sensor(s). The adaptive monitor (108) supports tasks performed by servers, such as $server_0$ (120), $server_1$ (130), $server_2$ (140), physical devices, such as $physical device_0$ (150) and $physical device_1$ (160), and other devices. The adaptive monitor (128) is shown herein stored in memory (124), and is in communication with processor (122). In one embodiment, the adaptive monitory (128) is an application that interfaces with the processing unit (122) for execution. The adaptive monitor (128) has access to $sensor_2$ (116) through a direct connection, and access to $sensor_0$ (112) and $sensor_1$ (114) through communication with the network of shared resources (110), and access to $sensor_3$ (118) through communication with the network of shared resources (110) and $client_1$ (164). Accordingly, the adaptive monitor (128) has the capability to communicate with each sensor in the network, either through a direct connection or through a network interface.

The adaptive monitor (128) determines the selection of metrics to measure and the frequency at which to measure the metrics. Selecting metrics and determining frequencies for the metrics includes determination of the sensor(s) that will perform the measurement of the metric. In one embodiment, the aspect of attaining the selection of a metrics is automated, with rules (102) setting the selection. The rules (102) are embedded in memory (124), in one embodiment in the shared data resources (170), or in one embodiment, an unshared data resource (not shown). In one embodiment, the rule(s) (102) utilized by the adaptive monitor (128) corresponding to the task the adaptive monitor (128) is supporting. In one embodiment, attaining the selection is dynamic, with the adaptive monitor (128) utilizing the rules (102) to implement a background process that creates and manages the metrics to be measured and the selection of the sensors to measure the metrics and application of the sensor data to a physical device or server in real-time. Accordingly, the adaptive monitor (128) utilizes rules (102) to support automatic selection of the metrics to be measured.

A mathematical optimization model (108) is utilized by the adaptive monitor (128) for computation of the optimal frequency at which to monitor each metric. In one embodiment, the aspect of attaining the optimal frequency is automated, with the mathematical optimization model (108) supporting the determination of the optimal frequency for each metric. The mathematical optimization model (108) is embedded in memory (124), and in one embodiment, in the shared data resources (170), or in one embodiment, an unshared data resource (not shown). In one embodiment, the optimization of frequencies is dynamic with the adaptive monitor (128) utilizing the mathematical optimization model (108) to implement a background process that determines the frequency at which to collect the sensor data. Accordingly, the adaptive monitor (128) utilizes the mathematical optimization model (108) to support automatic optimization of the frequencies at which to collect sensor data.

The adaptive monitor (128) either requests or is configured to automatically receive data from any one of the sensors in the network. For example, sensor data associated with $sensor_0$ (112) is communicated to the adaptive monitor (128) across the network of shared resources (110). The adaptive monitor (128) utilizes processor (122) to convert the received data into a metric value and stores the metric value in memory (124). Accordingly, the adaptive monitor (108) monitors a metric by utilization of a sensor.

The adaptive monitor (128) can determine, available resource(s) including capacities and utilization of the resource(s), individual resource utilization by a monitored metric, currently monitored metric(s), assigned weight of a metric(s), frequency of the monitored metric, and value of each metric. In one embodiment, the assigned weight, list of currently monitored metric(s), and frequency of the monitored metric(s) are stored in memory (124) which can be accessed by the adaptive monitor (128). In one embodiment, the quantity of metric(s) monitored and frequency of receiving values for those metrics by the adaptive monitor (128) is proportional to the resources utilized in the computer system. In one embodiment, the quantity of metrics monitored and the frequency of measurement of the metrics is proportional to processor (124) utilization, bandwidth utilization in the network connection provided to server$_0$ (120), and memory (124) utilization. Accordingly, the adaptive monitor (128) utilizes available system resources when monitoring a metric.

In one embodiment, a correlation coefficient(s) (104) and a metric weight (106) are stored in memory, such as primary storage location (e.g. rules (102)), and/or a secondary storage location (e.g. shared data resources (170)). A correlation coefficient (104) is utilized by the adaptive monitor (128) in order to determine which metric(s) to measure and the frequency to measure each metric subject to monitoring. A correlation coefficient (104) connotes relation of (e.g. dependency of) a metric to another metric and/or an environmental parameter. A metric weight (106) is a coefficient of a metric corresponding to the relationship of the metric and the task being supported by the metric monitoring. In one embodiment, the correlation coefficient (104) is used, by the adaptive monitor (128), to determine which metric(s) should be measured and the frequency of measuring each metric. In one embodiment, the metric weight (106) is used, by the adaptive monitor (128), to determine the frequency at which to measure each metric. Accordingly, a metric weight (106) and correlation coefficient (104) are accessible to the adaptive monitor (128) for optimal adaptation of monitoring.

Figure 2:
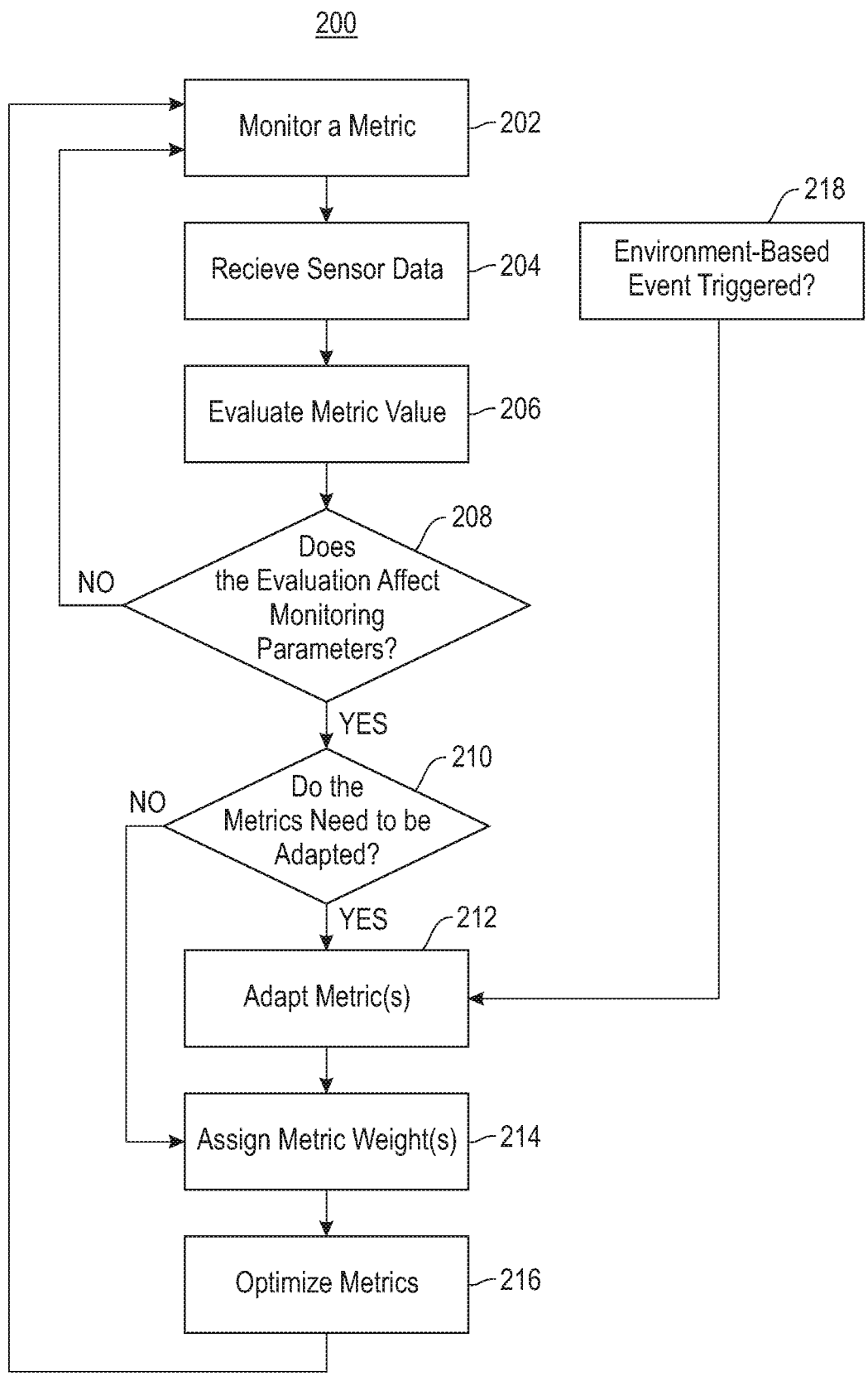
FIG. 2 depicts a flow chart illustrating a process for optimal adaptive monitoring.

Optimal adaptive monitoring can be employed in resource constrained environments. Referring to FIG. 2, a flow chart (200) is provided illustrating a process for optimal adaptive monitoring. As shown, a metric is monitored in support of a task on a device by utilizing a sensor to perform a measurement of the metric (202). In one embodiment, the metric is initially chosen based on a rule(s) associated with the task. The device may be, but is not limited to, a physical device, a client machine, and a server. Monitoring the metric includes a device, or software requesting or collecting sensor data related to a metric value(s) at an interval, or in one embodiment, continuously. The aspect of monitoring utilizes available resources in order to process a request of sensor data, transmit the request, the recipient (e.g. sensor) to receive and process the request, the recipient to measure the requested metric, the recipient to transmit a measurement as a response (e.g. sensor data), and a device or software to receive the sensor data, the device or software to process the sensor data, and the device or software to generate a metric value. In one embodiment, two or more metrics may be the subject of the monitoring shown and described herein. In one embodiment, the metrics may be monitored in parallel. The quantity of metrics monitored or quantity of sensors subject to the metric measurement(s) should not be considered limiting. Accordingly, one or more metrics are monitored at intervals utilizing available resources.

During monitoring, sensor data for the monitored metric is received (204), and in one embodiment processed by the device or software. The received metric value is evaluated (206) by the device or software. The device or software utilizes an evaluation rule(s) in order to perform the evaluation. The evaluation rule(s) include comparing the metric(s) value to a threshold including determining whether the metric value is below the threshold, equal to the threshold and/or greater than the threshold. In one embodiment, the evaluation rule(s) include utilizing the history of sensor data received from a particular sensor to determine a trend in the metric value, and in one embodiment to compare the trend to a second threshold. In one embodiment, the evaluation rule(s) include utilizing a deviation of the metric value when comparing the metric value and/or trend. Accordingly, metric values are received from a sensor and evaluated based on an evaluation rule.

After the evaluation at step (206), a determination is made of whether the evaluation affects one or more monitoring parameters (208) based on a rule. A monitoring parameter includes, but is not limited to, the selection of metrics that are measured and the frequency of performing a measurement. In one embodiment, the evaluation affects a monitoring parameter when a metric value meets or exceeds a threshold. If the determination at step (208) is positive, and the evaluation affects a monitoring parameter, the process proceeds to step (210) to begin optimal adaptation of the monitoring. If the determination at step (208) is negative, and the evaluation does not affect monitoring parameter(s) the process returns to step (202) and continues to monitor the current metric(s) at the current frequency. Accordingly, an affected monitoring parameter indicates the monitoring needs to be optimally adapted.

The device or software determines whether to adapt or otherwise extend the monitored metric(s) (210). The determination at step (210) includes determining whether the metrics currently monitored are the optimal metrics to be monitored in order to support the task on a physical device. The determination is based on the correlation of the affected monitoring parameter to each metric. The correlation may be positive or negative. In one embodiment, the correlation is based on a correlation coefficient of a metric having a metric value evaluated to affect the monitoring parameter. If the determination is positive at step (210), the process proceeds to adapt which metrics are monitored (212). In one embodiment, the determination is positive when a currently monitored metric has a negative correlation to the affected monitoring parameter. In one embodiment, the determination is positive when an unmonitored metric has a positive correlation to the affected a monitoring parameter. However, if the determination is negative at step (210), the process proceeds directly to assigning weight(s) of the metric(s) (214). Accordingly, the affected monitoring parameter is utilized to determine whether the metric(s) need to be adapted before the metrics are optimized.

At any time an environmental-based event is triggered (218), with the event trigger proceeding to step (212) to adapt the metrics. An environmental-based event may be triggered when an event requires reprioritization of the metrics to be monitored, new metric(s) to be monitored, or other metric(s) to be removed from monitoring based on an environmental rule. Examples of an environment-based event and triggering of this event includes, but is not limited to, a weather condition (e.g. a storm), a time of day (e.g. night), a particular location (e.g. a city center), a traffic condition (e.g. automobile accident), a season (e.g. fall), a predefined condition, and a user requested adaptation. In one embodiment, the environmental-based event is an auxiliary condition that is pushed to a physical device. Accordingly, the metrics are adapted if either an environment-based event occurs or a monitoring parameter is affected.

At step (212), the adaptation of the metric(s) includes adding an additional metric to be monitored and/or a removal of a metric that is being monitored. In one embodiment, the addition or removal of a metric includes changing a physical setting on the device. Metric(s) are added and removed based on an adaptation rule including a correlation to the affected monitoring parameter or environment-based event trigger. The correlation may be based on a correlation coefficient. In one embodiment, a metric may have a dependency on one or more other metrics. A dependency on one or more metrics connotes the metrics are related, thus the metrics should be added or removed as a group. A negative dependency connotes the metrics are unrelated. In one embodiment, a metric having a negative dependency with the environmental event or affected monitoring parameter is removed. In one embodiment, an environment-based event is associated with an adaptation rule that includes a predefined set of metrics that are to be monitored in response to the occurrence of the event, thus metrics are added and removed based on the predefined set of metrics. In one embodiment, when a metric is added having a negative dependency on a currently monitored metric, the currently monitored metric is removed. In one embodiment, if it is raining, a metric to monitor traffic speed is added. In one embodiment, if blood pressure was measured over a threshold, a metric to monitor heart rhythm is added. In one embodiment, a first metric having a negatively dependency is removed and a second metric having a positive dependency on the first metric is also removed unless the second metric has a secondary positive relationship to a third currently monitored metric or a newly added metric. Accordingly, metrics are added and removed based on their correlation to the environment-based event or affected monitoring parameter.

Following step (212), weights are assigned to the metrics that are currently monitored (and not removed) and any newly added metric(s) to be monitored (214) by the device or software. In one embodiment, the assignment of weights is stored in memory. In one embodiment, the assignment of weights is based upon an assignment rule. If a monitoring parameter was affected as determined at step (208), the assignment rule includes assigning weight(s) based upon current weights of the metric(s) having value(s) that affected a monitoring parameter, other currently monitored metric(s) having weight(s), a newly added metric(s) having a weight(s), and the correlation coefficient between metrics. If an environment-based event is triggered, the assignment rule includes assigning weight(s) based upon the correlation coefficient between a metric(s) and the environment-based event, and the weight(s) of currently monitored metric(s) including a correlation coefficient of the newly added metric to the currently monitored metric. Accordingly, weights are assigned to each metric based on assignment rule.

Following assignment of the weights at step (214), the metrics are optimized for system resource capacity (216). The optimization includes changing a physical setting on device including changing a frequency of a measurement and/or assigning a frequency of measurement to a newly added metric. In one embodiment, the optimization maximizes frequencies of metrics with higher weights and minimizes frequencies of metrics with lower weights. After optimization of the metric(s) is performed the process returned to step (202) and monitors the active metric(s) at the optimized frequency(ies). Accordingly, a process is provided in order to optimally adapt monitoring of metrics in response to a monitoring parameter being affected or an environment-based event.

In one embodiment, the optimization includes offsetting the time a metric is measured from the time another metric is measured. The offsetting includes setting the occurrence of the first metric measurement from the occurrence of the second metric measurement. Accordingly, offsetting the metrics will allow both metrics to be measured at separate times thereby increasing the frequency at which each can be monitored while not exceeding available resource capacity.

In one embodiment, the optimal frequency interval of measurement for each metric from the metric set can be computed in order to maximize the frequency of the metrics with higher metric weights. In one embodiment, the optimal frequency is computed in logic embedded within memory in communication with a processor.

A mathematical model is used to compute the optimal frequency interval of measurement for each metric from the metric set. In order to compute the optimal frequency of measurement, the variables of a mathematical model are defined as follows; I represents the set of metrics that are to be monitored. K represents the set of the frequency intervals for measurement, ordered from lowest to the highest interval value. For example, there are different possible frequency intervals at which a metric can be measured (e.g. measured once every 10 ms, or once every 2 minutes). The minimum possible value in set K is the minimum possible measurement interval, $k_{min}$. The maximum possible value in K is the maximum possible measurement interval, $k_{max}$ or $|K|$, where $|K|$ is the cardinality of the set K. The difference between the values of two successive elements of the set K is equal to the minimum given interval value. J is the set of potential times (e.g. time stamp, particular time, particular occurrence) at which the measurement can begin. IA is the cardinality of the set j, and is equal to $k_{max}$ ($|K|$). Elements of f are ordered and the step size between the elements is chosen where a minimum precision value of the monitoring is achieved. Accordingly, the set J is defined to ensure that the computed optimization will determine the optimal measurement intervals and times for one complete cycle of monitoring.

In the optimization computation, the binary variable $X_{ij}$ is 1 if metric, i∈I, is to be monitored at time, j∈J, otherwise the binary variable $X_{ij}$ is 0. The properties of the binary variable $X_{ij}$ are represented in the following equation.

$$X_{ij} \in \{0,1\}, \forall i \in I, \forall j \in J$$

The weight, is the weight for metric, i∈I. The following equation is used to maximize the measurement frequency of the metrics with a linear proportion to the weights of each monitored metric.

$$\max \sum_{i \in I} \sum_{j \in J} w_i * X_{ij}$$

The binary variable $B_{ij}$ is 1 if metric, i∈I, is to start at time, j∈J, otherwise the binary variable $B_{ij}$ is 0. The binary variable $B_{ij}$ is represented by the following equation.

$$B_{ij} \in \{0,1\}, \forall i \in I, \forall j \in J$$

The following equation ensures that each metric begins measurement once during a monitoring time cycle.

$$\text{s.t.} \sum_{j \in J} B_{ij} = 1, \forall i \in I$$

The binary variable $\text{Interval}_{ki}$ is 1 if metric, i∈I, is monitored at frequency k∈K, otherwise the binary variable $\text{Interval}_{ki}$ is 0. The binary variable $\text{Interval}_{ki}$ is represented by the following equation.

$$\text{Interval}_{ki} \in \{0,1\}, \forall k \in K, \forall i \in I$$

The following equation ensures each metric is assigned only one interval.

$$\sum_{k \in K} Interval_{ki} = 1, \forall i \in I$$

The relationship between $X_{ij}$ and $B_{ij}$ is represented in the following equation which sets the first monitored time to 1.

$$X_{ij} \geq B_{ij}, \forall i \in I, \forall j \in J$$

The relationship between $X_{ij}$ and $B_{ij}$ is further defined in the following equation which sets all the monitoring before the first measurement for each metric, $i \in I$, to zero.

$$X_{ij} \leq (1 - B_{ij}), \forall l \in \{1, \ldots, j-1\}$$

$X_{ij}$ and $B_{ij}$ ensure that measurement of each metric will begin at a specific chosen time. The following equation ensures that the subsequent measurements are at a similar interval for each metric.

$$\sum_{z \in \{j, \ldots, j+k-1\}} X_{ij} \geq Interval_{ki},$$

$$\forall i \in I, \forall j \in J : (j + k - 1) \in J, \forall K \in K$$

The set of resources used for the metric monitoring is defined as R. Each resource, $r \in R$, has a have a given capacity, $rcap_{rj}$, at time, $j \in J$. Each metric, $i \in I$, utilizes an amount, $ut_{ir}$, of resource, $r \in R$, when the metric, $i \in I$, is being monitored at time, $j \in J$. The following equation ensures that at each time, $j \in J$, the total resource utilization of each metric, $i \in I$, monitored is less than or equal to the available resources at that time for each resource, $r \in R$.

$$\sum_{i \in I} ut_{ir} * X_{ij} \leq rcap_{jr}, \forall j \in J, \forall r \in R$$

Computing the preceding equations optimizes the measurement intervals and times for one complete monitoring cycle. The equations can be recomputed for each monitoring cycle. In one embodiment, computing and solving the preceding equations guarantees an optimal solution (e.g. optimal frequency and optimal start time) which maximizes the frequency of the monitored metrics while limiting use of available resources. Accordingly, the frequency at which to measure a metric can be computed in order to optimally monitor metrics which utilize constrained resources.

Aspects of adapting monitoring provided in FIGS. 1-2, employ one or more functional tools to support use of adaptive monitoring. Aspects of the functional tool, e.g. adaptive monitor, and its associated functionality may be embodied in a computer system/server in a single location, or in one embodiment, may be configured in a cloud based system sharing computing resources. With references to FIG. 3, a block diagram (300) is provided illustrating an example of a computer system/server (302), hereinafter referred to as a host (302) in communication with a cloud based support system, to implement the processes described above with respect to FIGS. 1-2. Host (302) is operational with numerous other general purpose or special purpose computing system environments or configurations. Examples of well-known computing systems, environments, and/or configurations that may be suitable for use with host (302) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (302) may be described in the general context of computer system-executable instructions, such as program modules, being executed by a computer system. Generally, program modules may include routines, programs, objects, components, logic, data structures, and so on that perform particular tasks or implement particular abstract data types. Host (302) may be practiced in distributed cloud computing environments where tasks are performed by remote processing devices that are linked through a communications network. In a distributed cloud computing environment, program modules may be located in both local and remote computer system storage media including memory storage devices.

Figure 3:
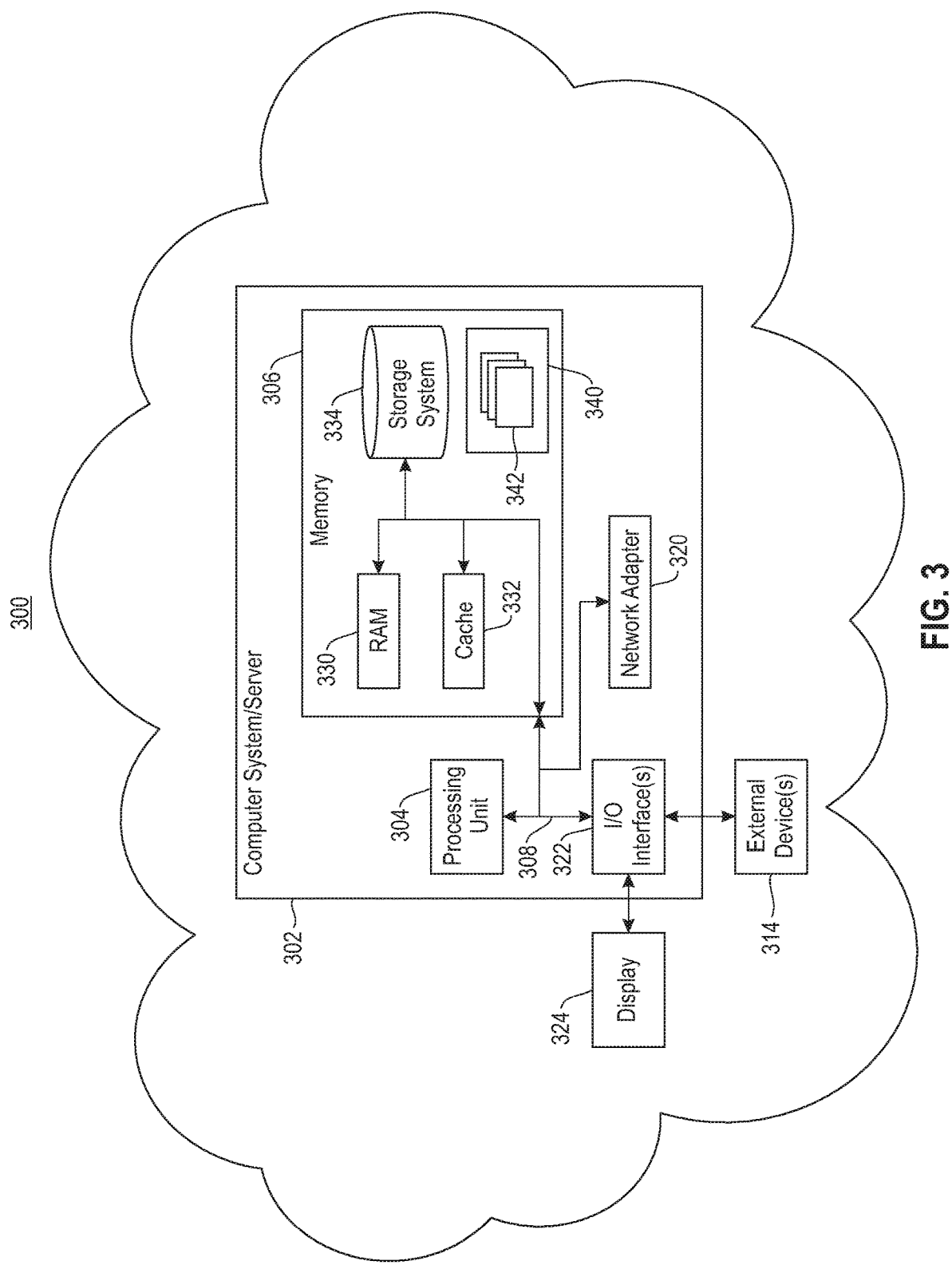
FIG. 3 is a block diagram illustrating an example of a computer system/server of a cloud based support system, to implement the process described above with respect to FIGS. 1-2.

As shown in FIG. 3, host (302) is shown in the form of a general-purpose computing device. The components of host (302) may include, but are not limited to, one or more processors or processing units (304), a system memory (306), and a bus (308) that couples various system components including system memory (306) to processor (304). Bus (308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (302) typically includes a variety of computer system readable media. Such media may be any available media that is accessible by host (302) and it includes both volatile and non-volatile media, removable and non-removable media.

Memory (306) can include computer system readable media in the form of volatile memory, such as random access memory (RAM) (330) and/or cache memory (332). By way of example only, storage system (334) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (308) by one or more data media interfaces.

Program/utility (340), having a set (at least one) of program modules (342), may be stored in memory (306) by way of example, and not limitation, as well as an operating system, one or more application programs, other program modules, and program data. Each of the operating systems, one or more application programs, other program modules, and program data or some combination thereof, may include an implementation of a networking environment. Program modules (342) generally carry out the functions and/or methodologies of embodiments to store and analyze data.

For example, the set of program modules (342) may include the modules configured for adaptive monitoring as described in FIGS. 1 and 3.

Host (302) may also communicate with one or more external devices (314), such as a keyboard, a pointing device, etc.; a display (324); one or more devices that enable a user to interact with host (302); and/or any devices (e.g., network card, modem, etc.) that enable host (302) to communicate with one or more other computing devices. Such communication can occur via Input/Output (I/O) interface(s) (322). Still yet, host (302) can communicate with one or more networks such as a local area network (LAN), a general wide area network (WAN), and/or a public network (e.g., the Internet) via network adapter (320). As depicted, network adapter (320) communicates with the other components of host (302) via bus (308). In one embodiment, a plurality of nodes of a distributed file system (not shown) is in communication with the host (302) via the I/O interface (322) or via the network adapter (320). It should be understood that although not shown, other hardware and/or software components could be used in conjunction with host (302). Examples include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (306), including RAM (330), cache (332), and storage system (334), such as a removable storage drive and a hard disk installed in a hard disk drive.

Computer programs (also called computer control logic) are stored in memory (306). Computer programs may also be received via a communication interface, such as network adapter (320). Such computer programs, when run, enable the computer system to perform the features of the present embodiments as discussed herein. In particular, the computer programs, when run, enable the processing unit (304) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (302) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
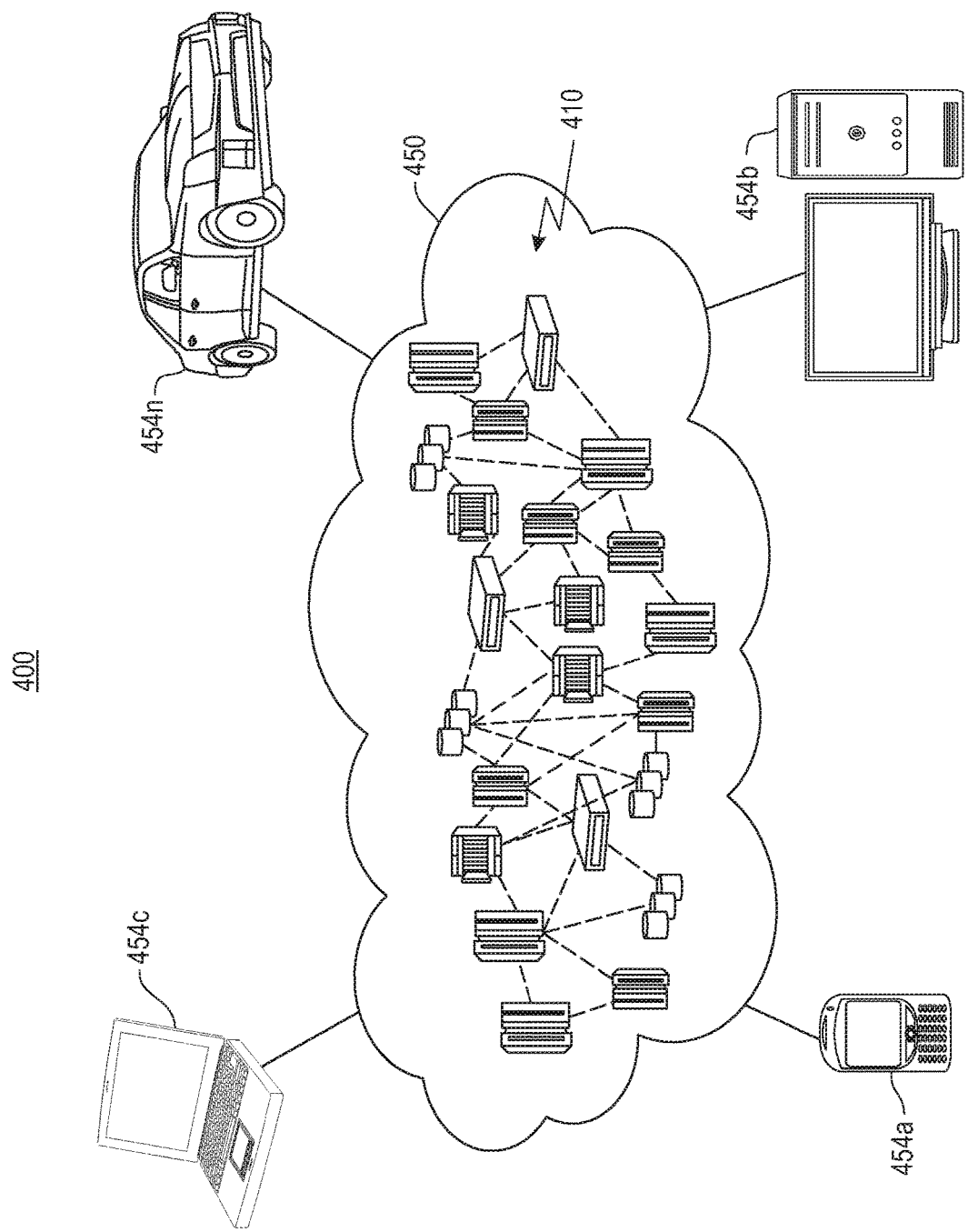
FIG. 4 depicts a block diagram illustrating a cloud computer environment.

Referring now to FIG. 4, an illustrative cloud computing network (400). As shown, cloud computing network (400) includes a cloud computing environment (450) having one or more cloud computing nodes (410) with which local computing devices used by cloud consumers may communicate. Examples of these local computing devices include, but are not limited to, personal digital assistant (PDA) or cellular telephone (454A), desktop computer (454B), laptop computer (454C), and/or automobile computer system (454N). Individual nodes within nodes (410) may further communicate with one another. They may be grouped (not shown) physically or virtually, in one or more networks, such as Private, Community, Public, or Hybrid clouds as described hereinabove, or a combination thereof. This allows cloud computing environment (400) to offer infrastructure, platforms and/or software as services for which a cloud consumer does not need to maintain resources on a local computing device. It is understood that the types of computing devices (454A-N) shown in FIG. 4 are intended to be illustrative only and that the cloud computing environment (450) can communicate with any type of computerized device over any type of network and/or network addressable connection (e.g., using a web browser).

Figure 5:
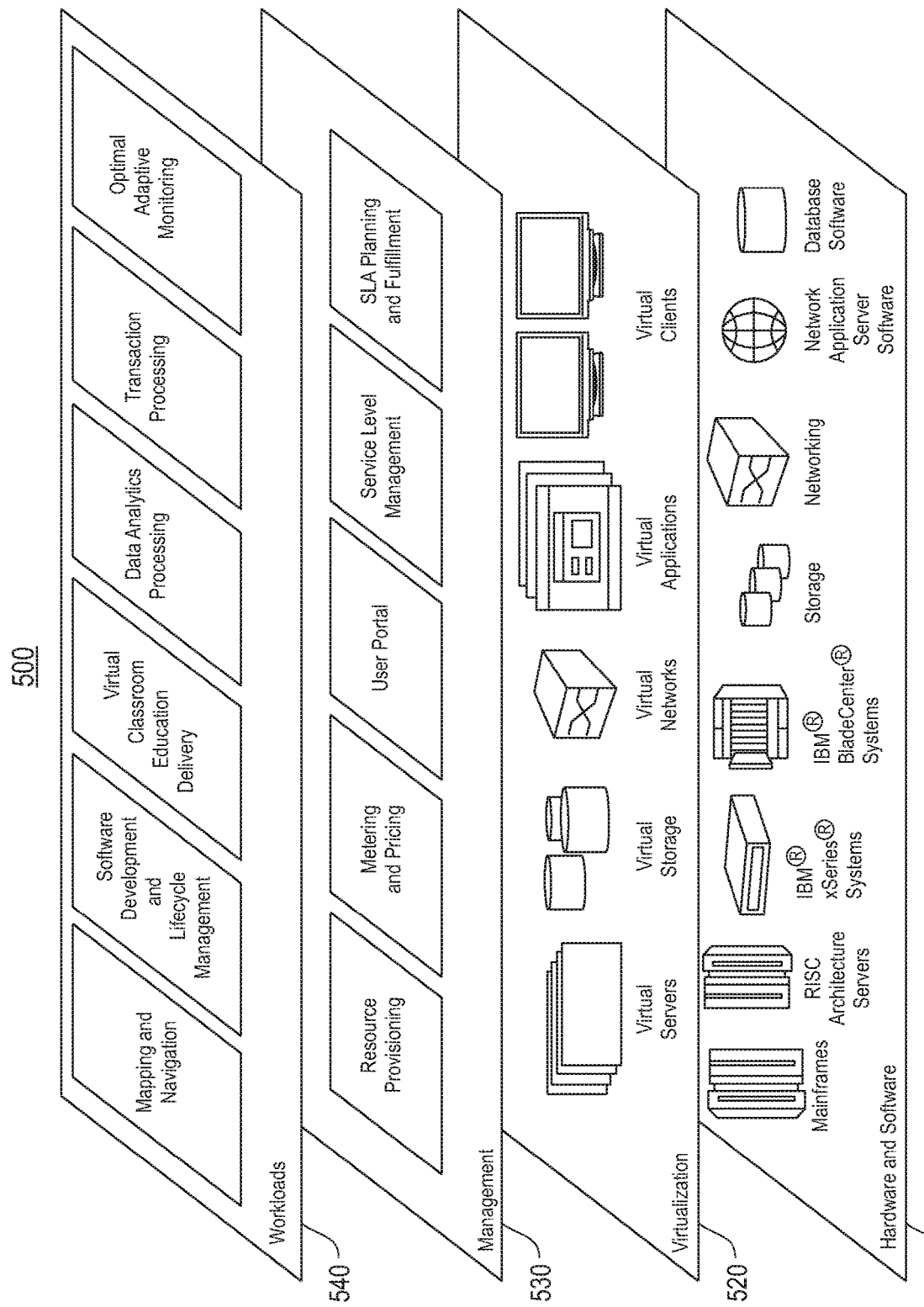
FIG. 5 depicts a block diagram illustrating a set of functional abstraction model layers provided by the cloud computing environment.

Referring now to FIG. 5, a set of functional abstraction layers provided by the cloud computing network of FIG. 3 is shown. It should be understood in advance that the components, layers, and functions shown in FIG. 5 are intended to be illustrative only, and the embodiments are not limited thereto. As depicted, the following layers and corresponding functions are provided: hardware and software layer (510), virtualization layer (520), management layer (530), and workload layer (540). The hardware and software layer (510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (520) provides an abstraction layer from which the following examples of virtual entities may be provided: virtual servers; virtual storage; virtual networks, including virtual private networks; virtual applications and operating systems; and virtual clients.

In one example, management layer (530) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and optimal adaptive monitoring.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation adaptive monitoring maximizes the monitoring frequency of metrics with greater importance.

It will be appreciated that, although specific embodiments have been described herein for purposes of illustration, various modifications may be made without departing from the spirit and scope of the embodiments. In particular, a sensor can be monitored remotely by any device connected to the cloud computing network. Additionally, resource constraints are not limited to the device actually performing the monitoring. Accordingly, the scope of protection of these embodiments is limited only by the following claims and their equivalents.

What is claimed is:

1. A computer system comprising:
    a memory; and
    a processor, communicatively coupled to the memory, wherein the processor is configured to:
    monitor at least one metric measured by one or more sensors communicatively coupled to the processor, including a first metric measured at a first frequency returning a first metric value;
    evaluate the first metric value;
    determine that an event has occurred;
    in response to determining that the event has occurred, dynamically adapt the monitoring of the at least one metric, wherein the processor is configured to dynamically adapt the monitoring of the at least one metric by:
        adjusting a selection of metrics, including assessing a selection of active metrics to retain, assessing a selection of active metrics to remove, and assessing a selection of metrics to add, the selections based on the evaluated first metric value and the occurrence of the event;
        in response to adjusting the selection of metrics, computing an updated frequency for each retained metric in the adjusted selection of metrics and a new frequency for each added metric in the adjusted selection of metrics based on resource availability; and
        selectively assigning the respective new and updated frequencies to the corresponding added and retained metrics.

2. The computer system of claim 1, wherein the event is a periodic-based event.

3. The computer system of claim 1, wherein the event is an environment-based event.

4. The computer system of claim 1, wherein the processor is further configured to compute a weight for each retained and added metric and selectively assign the computed weight to the added and retained metrics, wherein computation of the new and updated frequencies is based on the selectively assigned weight.

5. The computer system of claim 4, wherein the weight assignment individually influences a strength of a single metric within a grouping of active metrics.

6. The computer system of claim 4, wherein the processor is further configured to selectively maximize a monitoring frequency for each added and retained metric, the maximized monitoring frequency for each added and retained metric based on the computed weight and resource availability.

7. The computer system of claim 4, wherein the computed weight for each retained and added metric corresponds to a correlation coefficient between at least two metrics selected from the group consisting of: at least one retained metric and at least one added metric.

8. A computer program product for adaptive monitoring, the computer program product comprising a computer readable storage medium having program code embodied therewith, the program code executable by a processor to:
monitor at least one metric measured by one or more sensors communicatively coupled to the processor, including a first metric measured at a first frequency returning a first metric value;
evaluate the first metric value;
determine that an event has occurred;
in response to determining that the event has occurred, dynamically adapt the monitoring of the at least one metric, wherein the program code is configured to cause the processor to dynamically adapt the monitoring of the at least one metric by:
adjusting a selection of metrics, including assessing a selection of active metrics to retain, assessing a selection of active metrics to remove, and assessing a selection of metrics to add, the selections based on the evaluated first metric value and the occurrence of the event;
in response to adjusting the selection of metrics, computing an updated frequency for each retained metric in the adjusted selection of metrics and a new frequency for each added metric in the adjusted selection of metrics based on resource availability; and
selectively assigning the respective new and updated frequencies to the corresponding added and retained metrics.

9. The computer program product of claim 8, wherein the event is a periodic-based event.

10. The computer program product of claim 8, wherein the event is an environment-based event.

11. The computer program product of claim 8, wherein the program code is further configured to cause the processor to compute a weight for each retained and added metric and selectively assign the computed weight to the added and retained metrics, wherein computation of the new and updated frequencies is based on the selectively assigned weight.

12. The computer program product of claim 11, wherein the weight assignment individually influences a strength of a single metric within a grouping of active metrics.

13. The computer program product of claim 11, wherein the program code is further configured to cause the processor to selectively maximize a monitoring frequency for each added and retained metric, the maximized monitoring frequency for each added and retained metric based on the computed weight and resource availability.

14. A method for adaptive monitoring, the method comprising:
monitoring at least one metric measured by one or more sensors, including a first metric measured at a first frequency returning a first metric value;
evaluating the first metric value;
determining that an event has occurred;
in response to determining that the event has occurred, dynamically adapting the monitoring of the at least one metric, wherein dynamically adapting the monitoring of the at least one metric includes:
adjusting a selection of metrics, including assessing a selection of active metrics to retain, assessing a selection of active metrics to remove, and assessing a selection of metrics to add, the selections based on the evaluated first metric value and the occurrence of the event;
in response to adjusting the selection of metrics, computing an updated frequency for each retained metric in the adjusted selection of metrics and a new frequency for each added metric in the adjusted selection of metrics based on resource availability; and
selectively assigning the respective new and updated frequencies to the corresponding added and retained metrics.

15. The method of claim 14, wherein the event is a periodic-based event.

16. The method of claim 14, wherein the event is an environment-based event.

17. The method of claim 14, wherein further comprising:
computing a weight for each retained and added metric; and
selectively assigning the computed weight to the added and retained metrics, wherein computation of the new and updated frequencies is based on the selectively assigned weight.

18. The method of claim 17, wherein the weight assignment individually influences a strength of a single metric within a grouping of active metrics.

19. The method of claim 17, wherein further comprising selectively maximizing a monitoring frequency for each added and retained metric, the maximized monitoring frequency for each added and retained metric based on the computed weight and resource availability.

20. The method of claim 17, wherein the computed weight for each retained and added metric corresponds to a correlation coefficient between at least two metrics selected from the group consisting of: at least one retained metric and at least one added metric.

* * * * *